United States Patent
Gong et al.

(10) Patent No.: US 7,609,783 B2
(45) Date of Patent: Oct. 27, 2009

(54) AMPLITUDE SHIFT KEYING (ASK) DEMODULATION CIRCUIT BASED ON A SELF SAMPLE AS A BASIS APPLICATION IN AN ORGANISM IMPLANTATION MICROSYSTEM

(75) Inventors: Cihun-Siyong (Alex) Gong, Kaohsiung (TW); Muh-Tian Shiue, Hsinchu (TW); Chang Yin, Taipei (TW); Su Chun-Hsien, Kaohsiung (TW)

(73) Assignee: National Central University, Jhongli (TW)

( * ) Notice: Subject to any disclaimer, the term of this patent is extended or adjusted under 35 U.S.C. 154(b) by 563 days.

(21) Appl. No.: 11/464,618

(22) Filed: Aug. 15, 2006

(65) Prior Publication Data

US 2008/0075197 A1 Mar. 27, 2008

(51) Int. Cl.
*H03D 1/24* (2006.01)
*H03D 1/00* (2006.01)
(52) U.S. Cl. .................................. 375/320; 329/347
(58) Field of Classification Search ............. 375/300, 375/320; 329/304, 347
See application file for complete search history.

(56) References Cited

U.S. PATENT DOCUMENTS

| | | | | |
|---|---|---|---|---|
| 4,065,722 A | * | 12/1977 | Francis | 329/300 |
| 4,947,407 A | * | 8/1990 | Silvian | 375/340 |
| 6,198,361 B1 | * | 3/2001 | Arisawa | 332/115 |
| 6,307,428 B1 | * | 10/2001 | Nebel et al. | 329/311 |

* cited by examiner

*Primary Examiner*—Khanh C Tran
(74) *Attorney, Agent, or Firm*—C. G. Mersereau; Nikolai & Mersereau, P.A.

(57) ABSTRACT

An amplitude shift keying (ASK) demodulation circuit based on a self sample as a basis application in an organism implantation microsystem is a low-cost and high-performance ASK demodulation core, comprising a pulse shaper, a voltage scaler, a level contrastor, and a self-sampler for achievement of the demodulation core provided pretty digital features, and needs no passive resistor and capacitor, which may reduce the cost of design and prevent the problem with precision. Further, in the aspect of active point, the size of a transistor may be adjusted for variable control, and hence levels determined among modulation signals may be reduced to lower the complexity of voltage regulator in design.

5 Claims, 3 Drawing Sheets

| Source | Modulation Technique | Distinguishable Margin (V) | Operated Carrier (Hz) | Number of MOS | Capacitor(C) or Resister(R) | Power Consumption |
|---|---|---|---|---|---|---|
| Barú et al.[1] | OOK | 1 | 27K | 13** | 10 pF | 5uA@2V |
| Gunnar et al.[2] | OOK | 12(max.) | 5M | 12** | 1 pF | 30uA@10V |
| Liu et al.[4] | ASK | 6.5 ~ 7.5 | 1~10M | 15** | 10 pF | — |
| Yu et al.[3] | OOK | — | — | 13** | 3 C | 0.13mW |
| Dong et al.[5] | OOK | — | 10M | 11 | 1 C | — |
| Djemouai et al.[9] | ASK | 4 ~ 4.5(uA) | 250K | Many(> 50) | 1R, 1 C | — |
| Wang et al.[10] | ASK | 2.4 ~ 2.6(0) 3.2 ~ 3.4(1) | 2M | 17 | 1 R | 23.9mW* |
| Lee et al.[6] | ASK | 1.5 | 2M | — | 2 R, 1 C(min.) | — |
| Chen et al.[7][8] | ASK | 0.45 | 433M | 1 | 2R, 2C 11Kohm+11pF | 1.36mW@ 2MHZ data rate |
| This Work | ASK | 0.15(min.)@ 5nH noise effect | 2M | 32 | None | 0.5mW@ 1MHz data rate |

— : Not available at demodulator side

\* : Including output loading

\*\* : Still need extra current bias

Table 1

AMPLITUDE SHIFT KEYING (ASK) DEMODULATION CIRCUIT BASED ON A SELF SAMPLE AS A BASIS APPLICATION IN AN ORGANISM IMPLANTATION MICROSYSTEM

BACKGROUND OF THE INVENTION

1. Field of the Invention

This invention relates to an amplitude shift keying (ASK) demodulation circuit based on a self sample as a basis application in an organism implantation microsystem and particularly to a low-cost and high-performance demodulation circuit, which may lower the complexity of a voltage regulator.

2. Description of Related Art

Conventionally, at least a passive resistor or a capacitor is required in a demodulation circuit that is designed in an approach of non-coherent detection.

However, when the demodulation circuit is used in an implant chip, due to the limit of a medical carrier band, the capacitance becomes quite large and it is hard to reduce the area and cost of a whole chip in design and manufacturing.

Further, it is difficult for most demodulation circuits to lower a level determined between two sets of amplitude modulation to a degree so that the complexity of design of a voltage regulator of which a receiving end extracts stable direct current (DC) is difficultly reduced.

In consideration of improvability of the defects described above, this inventor especially concentrates on studies and operate in coordination with academic theories in addition to the experience in this field for many years, finally providing this invention for a design reasonable and effective improvement of the defects mentioned above.

SUMMARY OF THE INVENTION

In order to achieve a non-coherent demodulation, at least a passive resistor or a capacitor is required in a conventional demodulation structure for achievement of the normal operation of demodulation, in which due to the limit of a medical carrier band, the capacitance becomes quite large so that it is hard to reduce the area and cost of a whole chip in manufacturing. Further, it is difficult for most demodulation circuits to lower a level determined between two sets of amplitude modulation to a degree so that the complexity of design of a voltage regulator of which a receiving end extracts stable direct current (DC) is difficultly reduced.

To solve the technical problems, an amplitude shift keying (ASK) demodulation circuit based on a self sample as a basis application in an organism implantation microsystem is provided, comprising:

a pulse shaper as a Schmitt trigger that may generate a pair of sharpening clock-pulse signal required for the operation of a subsequent self-sampler;

A voltage scaler that may reversely raise an inputted modulation signal, in which the signal levels are higher than a lowest reference level (GND), and may separate the variation among different sets of amplitude modulation in the modulation signal for a next stage of advanced processing;

a level contrastor that may further separate a signal outputted by the voltage scaler; and a self-sampler that may sample the output of level contrastor by the clock-pulse signal generated from the pulse shaper, in which the sampled result is a demodulation output.

In this invention, no passive resistor and capacitor is thereby required for layout, which may reduce the cost of design and provide certain immunity from the impact caused by the offset in a manufacturing process. Besides, in this invention, the level determined among modulation signals may be reduced to lower the complexity of voltage regulator in design.

For a virtue compared with that of the prior art, the ASK demodulation circuit based on the self sample as the basis application in the organism implantation microsystem is provided. In this invention, the cost of design is consumedly reduced and the complexity of voltage regulator may be lowered, and hence the defect of difficult reduction of the area and cost of the whole chip in conventional design and manufacturing and that of difficult reduction of the design complexity of a voltage regulator of which the receiving end extracts stable direct current (DC) may be improved.

In order to further know the features and technical means of this invention, refer to the detailed description according to this invention accompanied with drawings; however, the accompanied drawings are provided for reference and illustration only and are not limited to this invention.

DETAILED DESCRIPTION OF THE PREFERRED EMBODIMENTS

Figure 1:
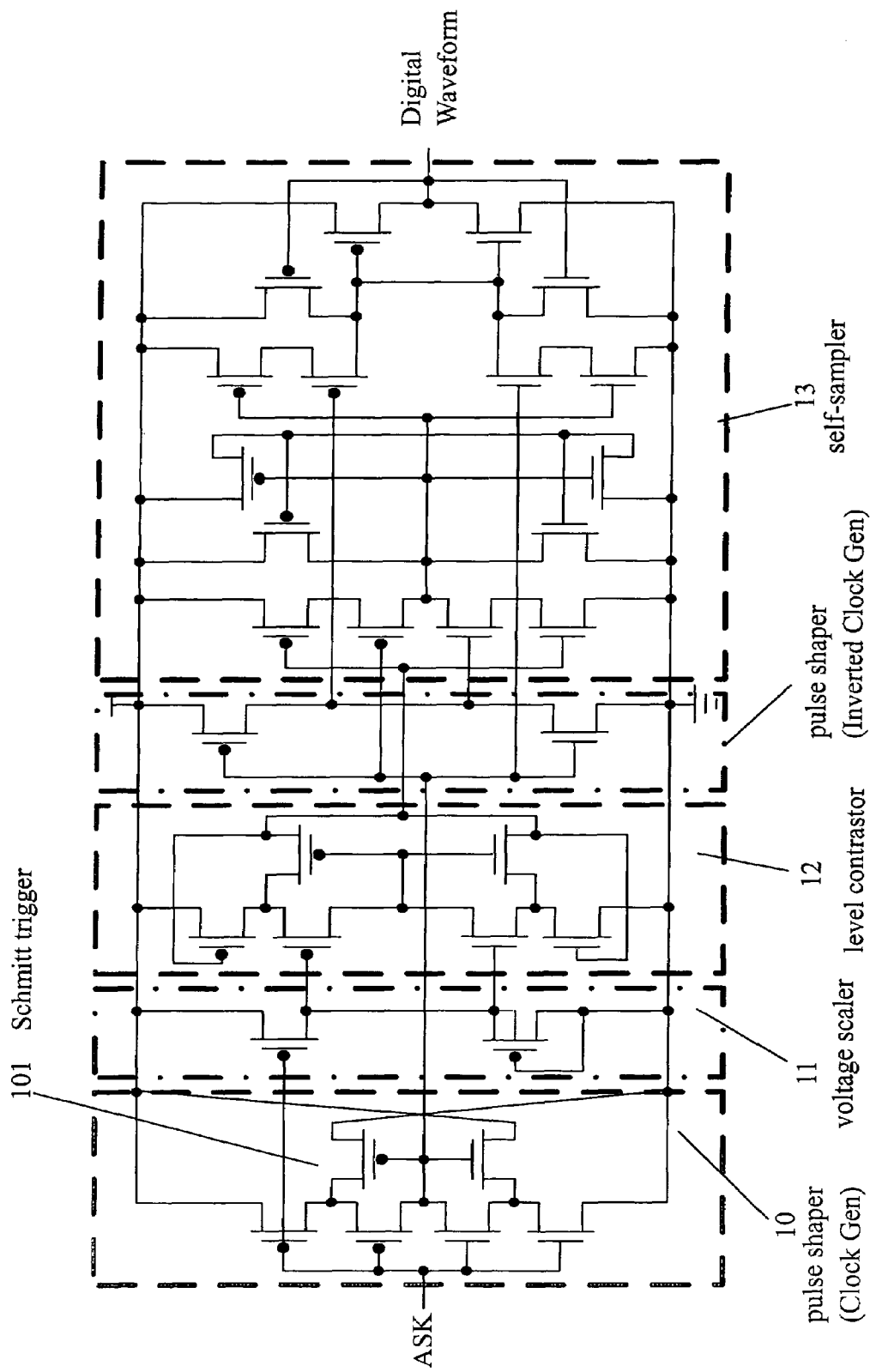
FIG. 1 is a schematic view illustrating a circuit according to this invention.
Figure 2:
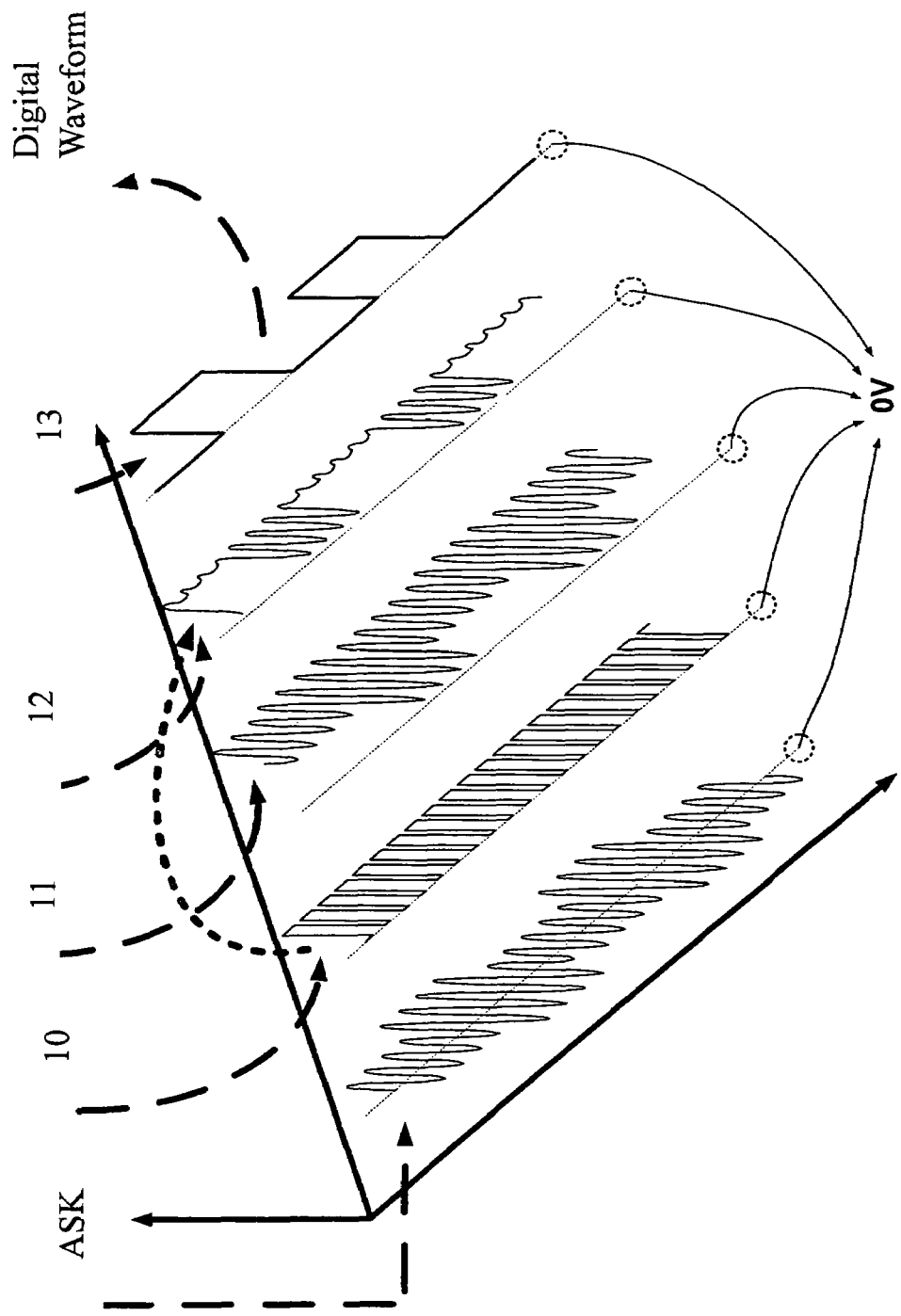
FIG. 2 is a conceptual view illustrating a whole demodulator according to this invention, comprising a pulse shaper, a voltage scaler, a level contrastor, and a self-sampler; and Table 1 gives comparison between a conventional demodulator and a demodulator according to this invention.

In this invention, an ASK demodulation circuit based on a self sample as a basis application in an organism implantation microsystem is provided. With reference to FIGS. 1 and 2, the demodulator comprises:

a pulse shaper (10) provided with a Schmitt trigger (101) that may generate a pair of sharpening clock-pulse signal required for the operation of a subsequent self-sampler (13);

a voltage scaler (111) that may reversely raise an inputted modulation signal, in which the signal levels are higher than a lowest reference level (GND), and may separate the variation among different sets of amplitude modulation in the modulation signal for a next stage of advanced processing, in which the modulation signal comprises sine-wave signals in two types of modulation levels, from which digital clock-pulse signals may be extracted, data recovery being implemented by means of sampling;

a level contrastor (12) that may further separate a signal outputted by the voltage scaler (11), in which the level contrastor (12) may make low-pass filtering achieved by means of a variable active point caused by hysteresis; and a self-sampler (13) that may sample the output of level contrastor (12) by the clock-pulse signal generated from the pulse shaper (13), in which the sampled result is a demodulation output.

With the design mentioned above, as shown in figure, MOS without passive RC is used in this invention for reduction of the cost and design complexity of a voltage regulator and for reduction of the inaccuracy caused by manufacturing-process drift. The structure is much more suitable for the implantation microsystem than that applied in the previous demodulation of the same type, works with Schmitt trigger, and is provided with a common-source configuration of MOS diode-connected load. The function of demodulation is achieved accurately by the level contrastor on the basis of low-power Schmitt trigger proposed by Al-Sarawi and by an enhanced C2MOS D-type flip-flop on the basis of a clocked CMOS (C2MOS).

Further, as shown in FIG. 2, in the present invention, the pulse shaper (10), the voltage scaler (11), the level contrastor (12), and the self-sampler (13) are used for achievement of the accurate demodulation output. In the entire flow, the clock pulse is first extracted and then the modulation signal is raised in a reverse direction, and after the raised signal is separated, it is sampled by the first extracted clock pulse for achievement of the complete demodulation.

10 pieces of conventional technical literature are given below, and each conventional technology is compared with that according to this invention, as shown in Table 1.

M. Bar'u, H. Valdenegro, C. Rossi, and F. Silveira, "An ASK demodulator in CMOS technology," in Proc. IV Iberchip Workshop, Mar del Plata, Argentina, 1998, pp. 37-42.

G. Gunnar, E. Bruun, and H. Morten, "A chip for an implantable neural stimulator," J. Analog Integr. Circuits Signal Process., vol. 22, pp. 81-89, 1999.

H. Yu, K. Najafi, "Circuitry for a wireless microsystem for neural recording microprobes," in Proc. 23rd IEEE-EMBS, vol. 1, pp. 761-764, 2001.

W. Liu, K. Vichienchom, M. Clements, S. C. DeMarco, C. Hughes, E. McGucken, M. S. Humayun, E. De Juan, J. D. Weiland, and R. Greenberg, "A neuro-stimulus chip with telemetry unit for retinal prosthetic device," IEEE J. Solid-State Circuits, vol. 35, no 10, pp. 1487-1497, October 2000.

Mian Dong, Chun Zhang, Zhihua Wang, and Dongmei Li, "A neurostimulus chip with telemetry unit for cochlear implant," IEEE International Workshop on Biomedical Circuits and Systems, pp. S1/3/INVS1/39-12, December 2004.

Shuenn-Yuh Lee and Shyh-Chyang Lee, "An implantable wireless bidirectional communication microstimulator for neuromuscular stimulation," IEEE Transactions on Circuits and Systems I: Regular Papers, Volume 52, Issue 12, pp. 2526-2538, December 2005.

Y. T. Lin, T. Wang, S. S. Lu, and G. W. Huang, "A 0.5 V 3.1 mW Fully Monolithic OOK Receiver for Wireless Local Area Sensor Network," IEEE International Asian Solid-State Circuit Conference, Hsin-Chu, November 2005.

C.-H. Chen, R.-Z. Hwang, L.-S. Huang S. Lin, H.-C. Chen, Y.-C. Yang, Y.-T. Lin, S.-A. Yu, Y.-H. Wang, N.-K. Chou, and S.-S. Lu, "A Wireless Bio-MEMS Sensor for C-Reactive Protein Detection Based on anomechanics", IEEE ISSCC, No. 30.6, San Francisco, February 2006.

A. Djemoual and M. Sawan, "New CMOS current-mode amplitude shift keying demodulator (ASKD) dedicated for implantable electronic devices," International Symposium on Circuits and Systems, Volume 1, pp. 1-441-4 Vol. 1, 23-26 May. 2004.

Chua-Chin Wang, Ya-Hsin Hsuch, U Fat Chio, and Yu-Tzu Hsiao, "A C-less ASK demodulator for implantable neural interfacing chips," International Symposium on Circuits and Systems, Volume 4, pp. IV-57-60 Vol. 4, 23-26 May. 2004.

From the results of full comparison, it is apparent that the demodulator according to this invention has a very good performance in the aspects of area, determination of levels among modulation signals, data rate, and power consumption.

In the description provided above, only operational principles are given that does not limit this invention. Many changes and modifications in the above described embodiment of the invention can, of course, be carried out without departing from the scope thereof.

What is claimed is:

1. An Amplitude Shift Keying (ASK) demodulation circuit based on a self sample as a basis application in an organism implantation microsystem, comprising:
   a pulse shaper provided with a Schmitt trigger that generates a pair of sharpening clock-pulse signal required for the operation of a subsequent self-sampler;
   a voltage scaler that reversely raises an inputted modulation signal, in which the signal levels are higher than a lowest reference level (GND), and separates the variation among different sets of amplitude modulation in the modulation signal for a next stage of advanced processing;
   a level contrastor that further separates a signal outputted by the voltage scaler; and
   a self-sampler that samples the output of level contrastor by the clock-pulse signal generated from the pulse shaper, in which the sampled result is a demodulation output.

2. The ASK demodulation circuit based on the self sample as the basis application in the organism implantation microsystem according to claim 1, wherein the modulation signal is extracted from a ASK-modulated carrier signal.

3. The ASK demodulation circuit based on the self sample as the basis application in the organism implantation microsystem according to claim 2, wherein a digital clock-pulse signal is extracted from the modulation signal, data recovery being implemented by means of sampling.

4. The ASK demodulation circuit based on the self sample as the basis application in the organism implantation microsystem according to claim 1, wherein the modulation signal comprises sine-wave signals in two types of modulation levels.

5. The ASK demodulation circuit based on the self sample as the basis application in the organism implantation microsystem according to claim 1, wherein the level contrastor makes low-pass filtering achieved by means of a variable active point caused by hysteresis.

* * * * *